US006978466B2

(12) United States Patent  
Kerly (10) Patent No.: US 6,978,466 B2
(45) Date of Patent: Dec. 20, 2005

(54) METHOD AND SYSTEM TO REDUCE THRASHING IN A MULTI-THREADED PROGRAMMING ENVIRONMENT

(75) Inventor: Philip J. Kerly, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 724 days.

(21) Appl. No.: 10/039,255

(22) Filed: Jan. 2, 2002

(65) Prior Publication Data

US 2003/0126313 A1    Jul. 3, 2003

(51) Int. Cl.[7] .............................................. G06F 3/00
(52) U.S. Cl. ...................... 719/332; 717/162; 717/168
(58) Field of Search ................... 719/331–332; 710/260; 713/200; 714/38; 717/162, 168

(56) References Cited

U.S. PATENT DOCUMENTS

| 5,937,186 A | * | 8/1999 | Horiguchi et al. ............ 712/244 |
| 6,067,608 A | | 5/2000 | Perry |
| 6,105,051 A | | 8/2000 | Borkenhagen et al. |
| 6,148,371 A | | 11/2000 | Hetherington et al. |
| 6,154,812 A | | 11/2000 | Hetherington et al. |
| 6,195,676 B1 | | 2/2001 | Spix et al. |
| 6,240,531 B1 | * | 5/2001 | Spilo et al. ..................... 714/38 |
| 6,529,985 B1 | * | 3/2003 | Deianov et al. ............. 710/260 |
| 6,779,187 B1 | * | 8/2004 | Hammond .................... 719/331 |
| 6,823,460 B1 | * | 11/2004 | Hollander et al. ........... 713/200 |

OTHER PUBLICATIONS

Jin et al. "An efficient solution to the cache trashing problem caused by true data sharing" 1998 IEEE, pp. 527-543.*
Sudo et al. "distributed-thread scheduling methods for reducing page-thrashing" 1997 IEEE, pp. 356-364.*
Robbins, John, "Bugslayer", Microsoft Systems Journal, Oct. 1998, 10 pages www.microsoft.com/msj/1098/bugslayer/bugslayer1098.htm.

* cited by examiner

Primary Examiner—Meng-Al T. An
Assistant Examiner—Van Hoa Nguyen
(74) Attorney, Agent, or Firm—Blakely, Sokoloff, Taylor & Zafman LLP (57) ABSTRACT

A method and system to reduce thrashing in a multi-threaded programming environment is disclosed. A method in accordance with one embodiment of the present invention includes intercepting an operating system thread creation request for a function, creating a thread including a stack in response to intercepting the operating system thread creation request, modifying an initial stack pointer of the stack, and executing the function utilizing the thread in response to modifying the initial stack pointer.

14 Claims, 8 Drawing Sheets

METHOD AND SYSTEM TO REDUCE THRASHING IN A MULTI-THREADED PROGRAMMING ENVIRONMENT

BACKGROUND OF THE INVENTION

1. Field of the Invention

The present invention relates generally to an improved method and system for data processing. More particularly, the present invention relates to a method and system to reduce thrashing in a multi-threaded programming environment.

2. Description of the Related Art

Many conventional data processing systems include operating systems which provide a multithreaded programming environment. Multithreading is the ability of an operating system to manage the use of a process by more than one entity (e.g. a user or another process) at a time or multiple requests for use by a single entity using a single copy of the process in memory. Each process managed by the operating system defines a virtual address space including code, data, and one or more threads associated with the process. Each thread within a process in turn defines a path of execution through the process and may include data processing system state (e.g. processor state) and a stack beginning at an aligned virtual address boundary. For example, under the Windows™ operating system available from Microsoft™ Corporation of Redmond, Wash., each thread's stack is created on a 1 MB (megabyte) boundary.

As a thread is executed on a processor, it accesses data at a location within its stack using the location's corresponding virtual addresses. In many modern data processing systems, the data may be stored in an entry within a virtually-addressable cache memory associated with the thread's processor which is indexed or "tagged" using the least significant bit(s) (e.g. the least significant 16 bits) of the data location's virtual address. In a data processing system having such a virtually-addressable cache memory shared among multiple physical or virtual processors, several threads may be created for a given process and the virtual addresses of corresponding locations within each thread's stack may be distinguishable only by the most significant bit(s) of the virtual address which designate the stack's starting boundary and initial stack pointer. As a result, thread execution and stack access within such multiprocessor data processing systems may cause shared, virtually-addressable caches to thrash.

BRIEF DESCRIPTION OF THE DRAWINGS

The present invention is illustrated by way of example and not limitation in the figures of the accompanying drawings in which similar references are utilized to indicate similar elements and in which.

DETAILED DESCRIPTION

A method and system to reduce thrashing in a multi-threaded programming environment are described herein. In the following detailed description, numerous specific details such as specific data processing system, processor, and process address space elements, structures, architectures, and configurations are set forth in order to provide a more thorough understanding of the present invention. It should be evident however, that these and other specific details described need not be utilized to practice the present invention. In other circumstances, well-known structures, elements, operations, or connections have been omitted, or have not been described in particular detail in order to avoid unnecessarily obscuring the present invention.

Figure 1:
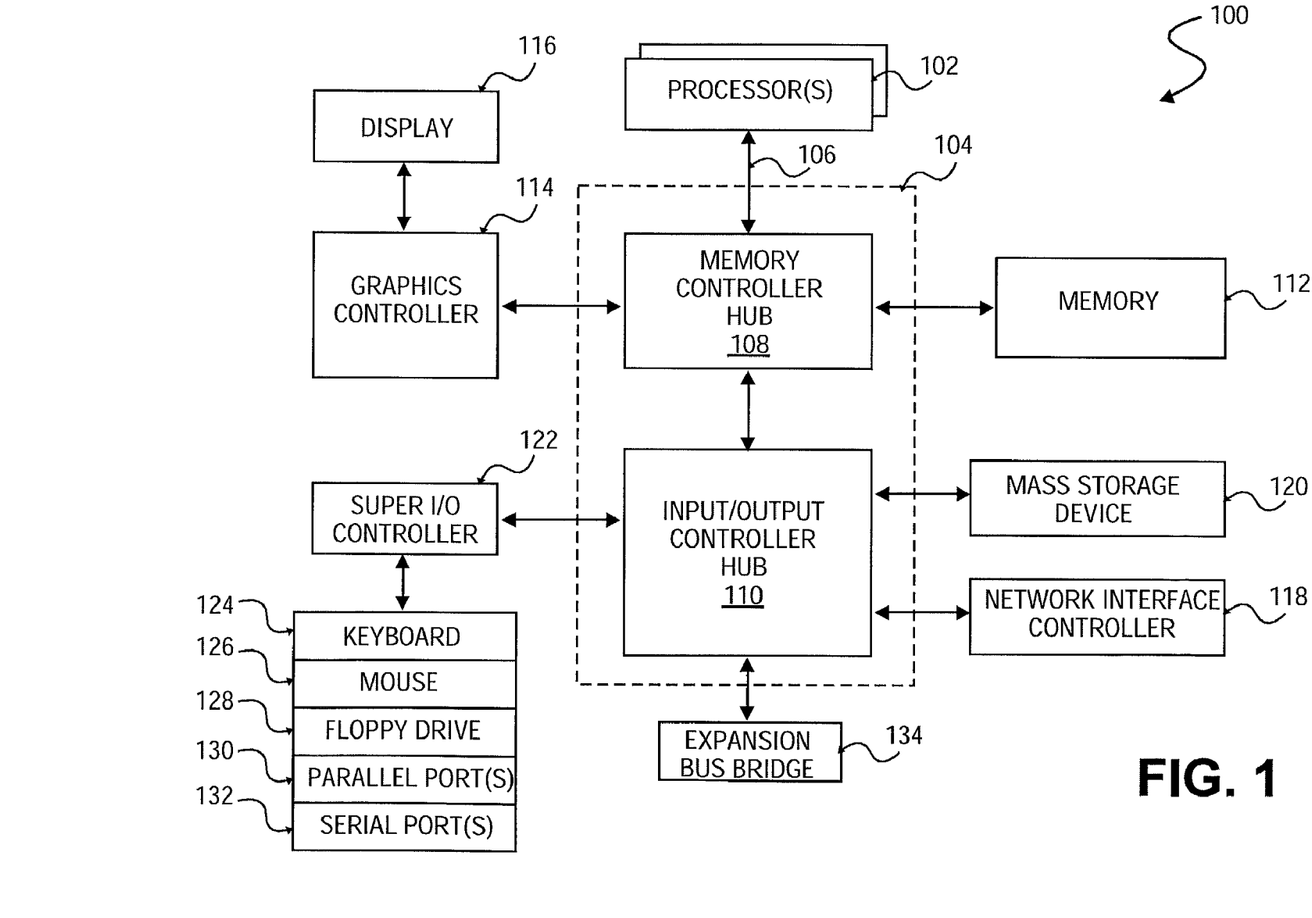
FIG. 1 illustrates an exemplary data processing system block diagram according to one embodiment of the present invention.

FIG. 1 illustrates an exemplary data processing system block diagram according to one embodiment of the present invention. In the illustrated embodiment, data processing system 100 comprises one or more processors 102 and a chipset 104 coupled to a processor system bus 106. Processor(s) 102 may each comprise any suitable processor architecture and in one embodiment comprises an Intel™ Architecture, used for example, in the Pentium™ family of processors available from Intel™ Corporation of Santa Clara, Calif. Chipset 104 in one embodiment of the present invention comprises a "north bridge" or memory controller hub (MCH) 108 and a "south bridge" or input/output (I/O) controller hub (ICH) 110 coupled together as shown. MCH 108 and ICH 110 may each comprise any suitable circuitry and in one embodiment, are each formed as a separate integrated circuit chip. Chipset 104 for other embodiments may comprise any suitable one or more integrated circuit or discrete devices.

MCH 108 may comprise a suitable interface controller to provide for any suitable communication link to processor system bus 106 and/or to any suitable device or component in communication with MCH 108. MCH 108 in one embodiment provides suitable arbitration, buffering, and coherency management for each interface.

MCH 108 is coupled to processor system bus 106 and provides an interface to processor(s) 102 over the processor system bus 106. Processor(s) 102 may, in alternative embodiments of the present invention be combined with MCH 108 or chipset 104 to form a single chip. MCH 108 in one embodiment also provides an interface to a memory 112 and a graphics controller 114, each of which may be coupled to MCH 108 as illustrated. Memory 112 is capable of storing data and/or instructions executable on a processor such as one of the processor(s) 102 of data processing system 100 and may comprise any suitable memory such as, for example, dynamic random access memory (DRAM). Graphics controller 114 controls the display of information on a suitable display 116, such as a cathode ray tube (CRT) or liquid crystal display (LCD) for example, coupled to graphics controller 114. In the illustrated embodiment, MCH 108 interfaces with graphics controller 114 through an accelerated graphics port. It should be appreciated however that the present invention may be practiced using any suitable graphics bus or port standard. In one embodiment graphics controller 114 may alternatively be combined with MCH 108 to form a single chip.

MCH 108 is also coupled to ICH 110 to provide access to ICH 110 through a hub interface. ICH 110 provides an interface to I/O devices or peripheral components for data processing system 100. ICH 110 may comprise any suitable interface controller to provide for any suitable communication link to MCH 108 and/or to any suitable device or component in communication with ICH 110. ICH 110 in one embodiment provides suitable buffering and arbitration for each interface.

In the illustrated embodiment, ICH 110 further provides an interface to a network interface controller 118, a mass storage device 120, and to a keyboard 124, a mouse 126, a floppy disk drive 128, as well as additional devices via one or more standard parallel 130 or serial 132 ports through a super I/O controller 122. Network interface controller 118 or alternatively a modem codec (not illustrated) may be utilized to couple data processing system 100 to a suitable communications network via various well-known methods. Mass storage device 220 may comprise any suitable device or component to store data and/or instructions such as a tape or fixed disk magnetic storage device, or an optical storage device such as a compact disk (CD) or digital versatile disk (DVD) read only memory (ROM) device. In one embodiment of the present invention, mass storage device 120 comprises one or more hard disk drives (HDD). In the illustrated embodiment, ICH 110 also provides an interface to an expansion bus bridge 134 to facilitate the attachment of additional I/O devices or peripheral components via an expansion bus such as a Peripheral Component Interconnect (PCI), Industry Standard Architecture (ISA), or Universal Serial (USB) bus (not illustrated).

Embodiments of the present invention may include software, data processing hardware, and various processing methods and operations, further described herein. The features, methods, and process operations of the present invention may be embodied in executable instructions embodied within a machine-accessible medium such as memory 112, mass storage device 120, removable disk media coupled with floppy disk drive 128, a communications network available via network interface controller 118, or the like.

A machine-accessible medium may include any mechanism that provides (i.e., stores and/or transmits) information in a form accessible by a machine (e.g., data processing system 100). For example, a machine-accessible medium includes but is not limited to: read only memory (ROM); random access memory (RAM); magnetic disk storage media; optical storage media; flash memory devices; electrical, optical, acoustical or other form of propagated signals (e.g., carrier waves, infrared signals, digital signals, etc.); or the like. The instructions can be used to cause a general or special purpose processor such as one or more of processor(s) 202, programmed with the instructions, to perform methods or processes of the present invention. Alternatively, the features, methods, and operations of the present invention may be performed by specific hardware components that contain hard-wired logic, or by any combination of programmed data processing components and custom hardware components.

It should also be appreciated that the present invention may be practiced utilizing a data processing system 100 having a greater or lesser number of components as the illustrated exemplary system. For example, data processing system 100 may comprise, in alternative embodiments of the present invention, one of a wide variety of server or client computer systems or devices such as a workstation, personal computer, "thin client" (i.e. network computer or NetPC), Internet appliance, terminal, palmtop computing device, robust cellular or Personal Communications Services (PCS) telephone, "thin server" (sometimes called an appliance server, application server, or specialty server), or the like.

Figure 2:
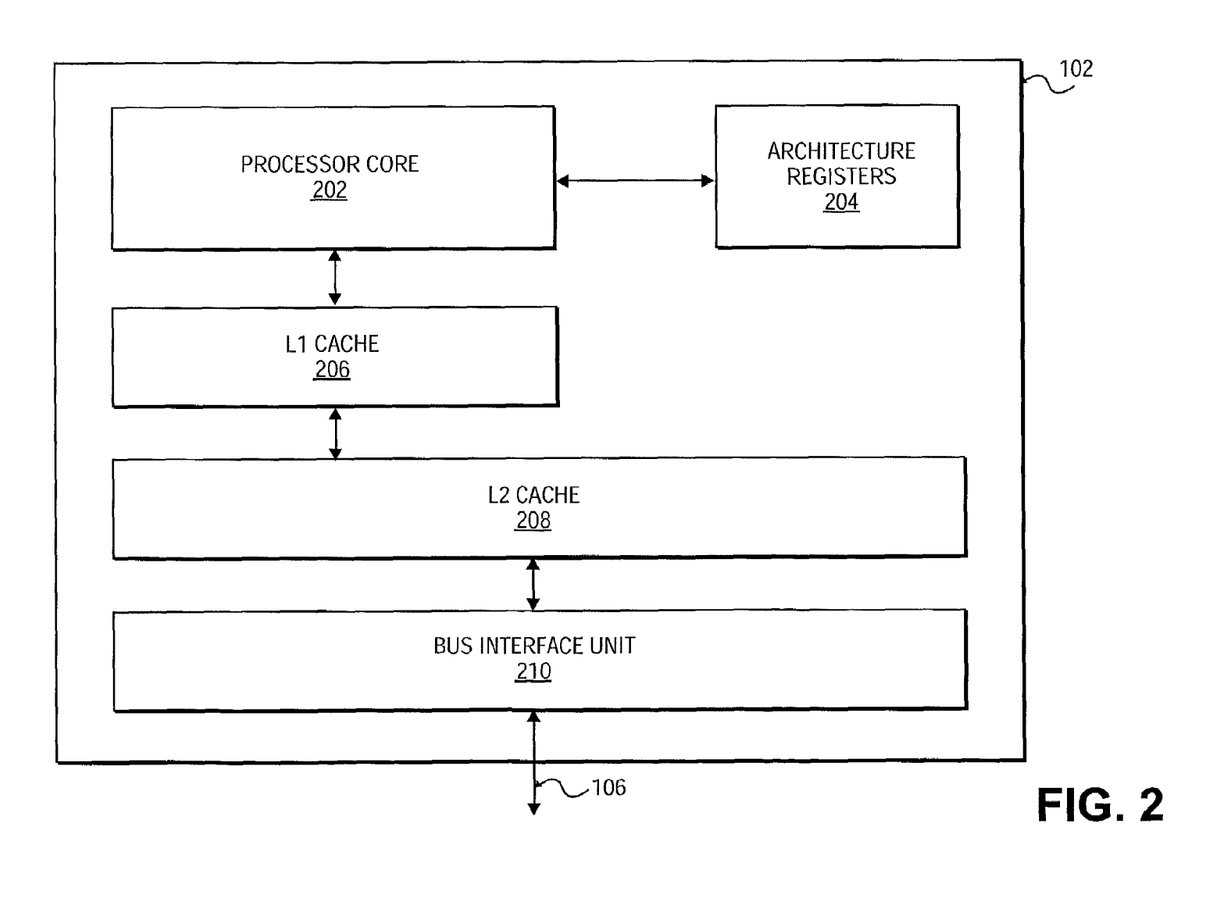
FIG. 2 illustrates a physical block diagram of a processor 102 of FIG. 1 according to an embodiment of the present invention.

FIG. 2 illustrates a physical block diagram of a processor 102 of FIG. 1 according to an embodiment of the present invention. The illustrated processor 102 may comprise at least a processor core 202, one or more architectural registers 204, a first level (L1) cache 206, a second level (L2) cache 208, and a bus interface unit (BIU) 210. In one embodiment, a thread within a process address space executes via processor core 202 and accesses data stored within L1 cache 206 utilizing virtual addresses corresponding to locations within an associated stack.

Processor core 202 may comprise any number of functional units (not illustrated) such as instruction fetch units, instruction decode units, instruction dispatch units, integer or floating point execution units, reorder buffers, instruction retirement units, or the like to execute instructions and process data. In one embodiment, processor 102 provides support for at least two virtual processors sharing processor core 202 and L1 cache 206 by maintaining a separate set or copy of architectural registers 204 corresponding to each virtual processor. Architectural registers 204 define the architectural state of the processor 102 and may include basic program execution registers such as an instruction pointer or program counter, various execution flags, and general purpose registers to store data and instructions to be processed, executed, or otherwise manipulated by processor core 202, as well as various other registers utilized in the operation of processor 102. In one embodiment, a thread may include data processing system state in the form of the values of one or more of architectural registers 204.

BIU 210 may be utilized to couple processor 102 to data processing system 100 via a processor system bus 106, allowing processor 102 to load and to store data and instructions to and from memory 112. Data and instructions retrieved from memory 112 via BIU 210 or produced by processor core 202 may be stored within one or more of L1 cache 206 and L2 cache 208. In one embodiment, L1 cache 206 and L2 cache 208 function hierarchically to provide data and instructions to processor core 202. In one embodiment, L2 cache 208 stores a subset of the data and/or instructions found within memory 112 indexed utilizing a physical address generated by an address translation functional unit (not illustrated) within processor 102. In another embodiment, L1 cache 206 in turn stores a subset of the data and/or instructions found within the L2 cache 208 indexed utilizing a virtual address generated by the processor core 202.

L1 cache 206 is checked first on a memory access to determine whether a desired block or memory location is (a cache hit) or is not (a cache miss) present utilizing a virtual address generated by processor core 202. In one embodiment, only the least significant bit(s) (e.g. the least significant 16 bits) are utilized for the described L1 cache 206 hit/miss resolution. On a cache miss, L2 cache 208 is checked to determine whether the desired block or memory location is present using a physical address generated by an address translation unit (not illustrated). If the desired block or memory location is not present within the L1 cache 206 or L2 cache 208, it may be retrieved from memory 112 via the processor system bus 106 and BIU 210 and stored within the L1 206 and/or L2 208 cache for future access.

It should be appreciated that in alternative embodiments of the present invention L1 cache 206 and/or L2 cache 208 may be located outside and separate from processor 102 and may be unified (i.e. containing instructions and data) or split. Similarly, in other embodiments, L1 cache 206 and L2 cache 208 may be arranged differently within processor 102. For example, L1 cache may be coupled directly to BIU 210 rather than or in addition to being coupled to BIU 210 via L2 cache 208. In still other embodiments, L2 cache 208 may be indexed via a virtual address rather than a physical address or eliminated altogether.

Figure 3:
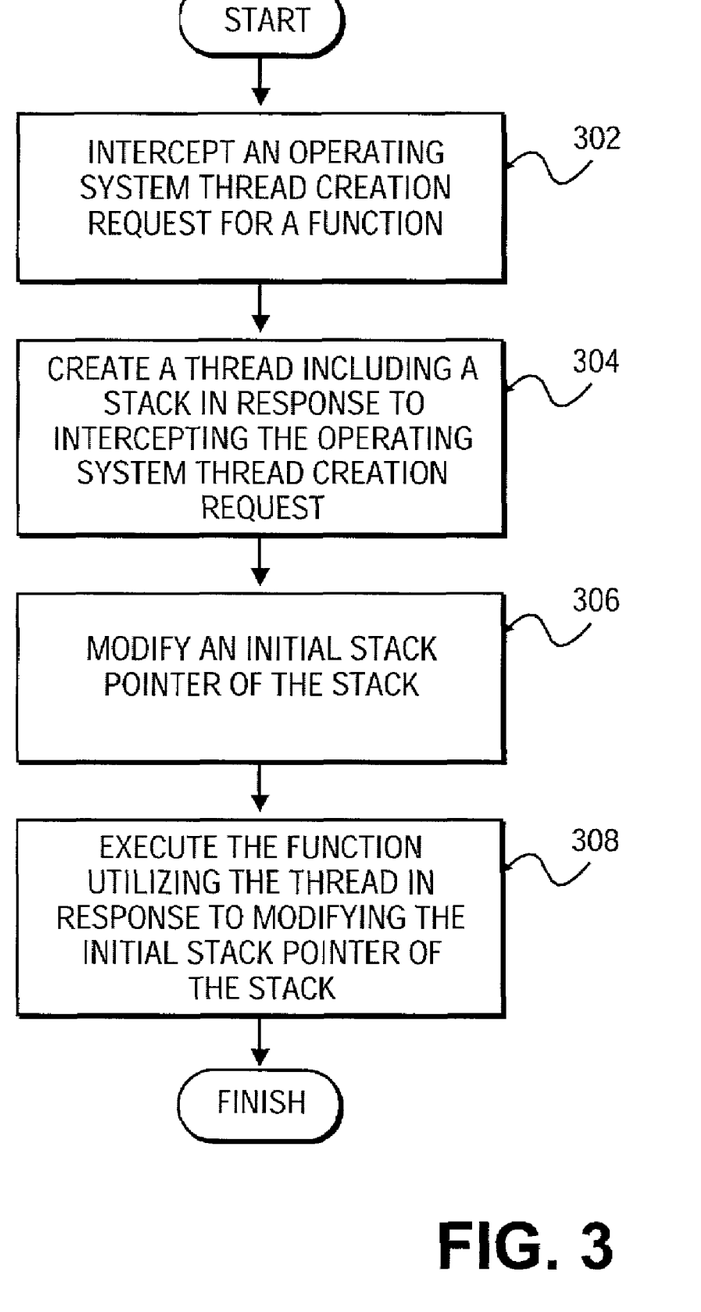
FIG. 3 illustrates a logic flow diagram according to an embodiment of the method of the present invention.

FIG. 3 illustrates a logic flow diagram according to an embodiment of the method of the present invention. The illustrated process begins and an operating system thread creation request for a function is intercepted (block 302) causing a thread including a stack to be responsively created (block 304). A function may comprise any code section or sequence of instructions within and including an application program. Next, an initial stack pointer of the stack is modified (block 306) and the function is responsively executed utilizing the created thread as shown (block 308) before the illustrated process terminates. It should be appreciated that the order of the operations described herein may be modified in various alternative embodiments and that various operations or actions may be combined, subdivided, or eliminated without departing from the broader spirit and scope of the present invention.

Figure 4:
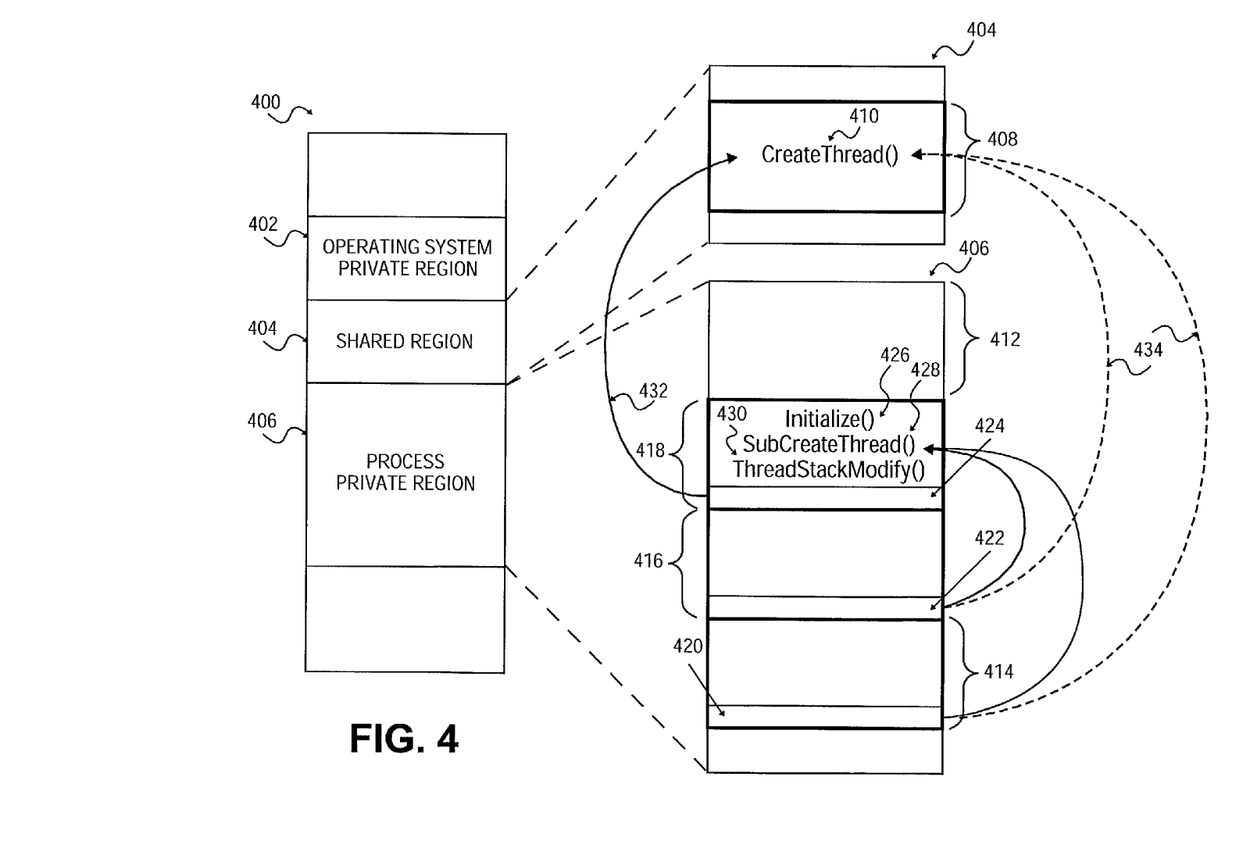
FIG. 4 illustrates a process address space diagram according to an embodiment of the present invention.

FIG. 4 illustrates a process address space diagram according to an embodiment of the present invention. In the illustrated embodiment, the address space 400 of a process within a data processing system includes an operating system private region 402, a shared region 404, and a process private region 406. It should be appreciated that in alternative embodiments, operating system private region 402, shared region 404, and process private region 406 may be combined or subdivided to form a greater or lesser number of regions and similarly may be ordered or arranged differently within address space 400.

Operating system private region 402 and shared region 404 together may include operating system code, memory-mapped files, dynamic-link libraries (DLLs), and applications or other components or resources utilized by an operating system or shared among the data processing system's other processes. In one embodiment, shared region 404 includes a kernel dynamic-link library (DLL) 408 such as the Kernel32 DLL of the Win32™ application programming interface (API). Kernel DLL 408 may in turn include an operating system thread creation function 410 such as the CreateThread function provided by the Win32™ API. In alternative embodiments, operating system thread creation function 410 may comprise an alternate Win32™ or Microsoft™ Foundation Class (MFC) thread creation function (e.g., _beginthread, _beginthreadex, cwinthread, afxbeginthread) or any one of a number of non-Win32™-based (e.g. Unix/Posix) thread creation functions.

In one embodiment, process private region 406 comprises a stack area 412, an application 414, and a thread creation dynamic-link library 418 according to the present invention. In an alternative embodiment, process private region 406 may additionally comprise one or more conventional dynamic-link libraries 416. Thread creation dynamic-link library 418 may include an initialization function 426, a substitute thread creation function 428, a thread stack modification function 430, and a reference table 424. In the illustrated embodiment, thread creation DLL 418, application 414, and conventional dynamic-link library 416 may each contain a reference table (e.g. a Windows™ "thunk" table) to dynamically resolve or bind addresses or other references to various functions within address space 400 at run time. For example, reference table 424 may include a reference 432 to operating system thread creation function 410 within kernel DLL 408 which is utilized whenever a call to operating system thread creation function 410 is made within thread creation dynamic-link library 418.

Figure 5:
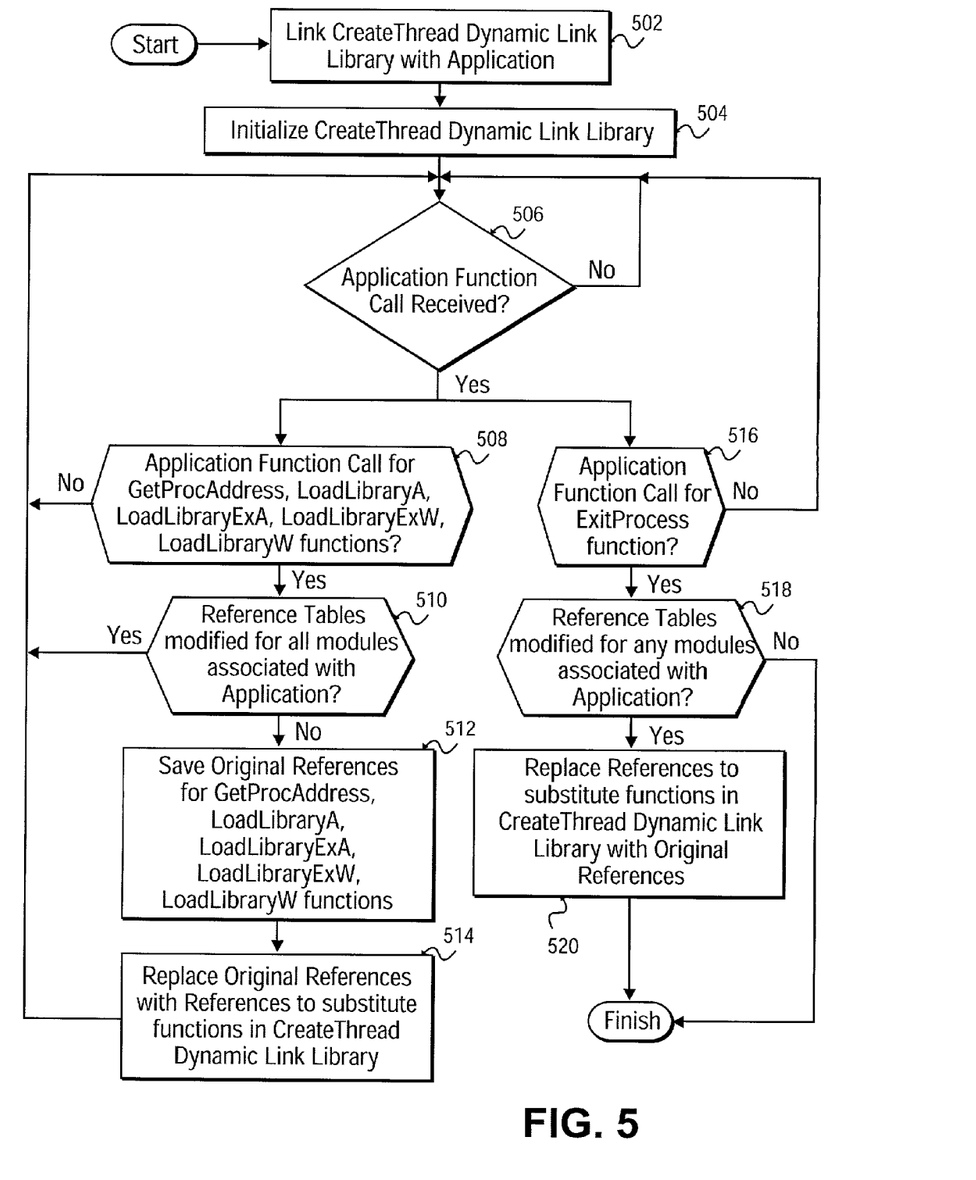
FIG. 5 illustrates a logic flow diagram of an initialization function 426 of FIG. 4 according to an embodiment of the method of the present invention.

Once thread creation DLL 418 is loaded within address space 400, initialization function 426 is called or invoked to initialize the thread creation DLL 418. In one embodiment, initialization function first detects the processor type to determine if the method and system of the present invention may be or should be implemented. Referring now to FIG. 5, a logic flow diagram of the initialization function 426 of FIG. 4 according to an embodiment of the method of the present invention is illustrated. The illustrated function process begins and thereafter the thread creation DLL 418 is linked with application 414 (block 502) and then initialized (block 504).

In one embodiment, initialization of the thread creation DLL 418 comprises identifying each program module loaded within address space 400 which is linked or otherwise associated with application 414, saving an original reference table reference for at least one of a plurality of functions including the following Win32™ API functions: CreateThread, ExitProcess, GetProcAddress, LoadLibraryA, LoadLibraryExA, LoadLibraryExW, and LoadLibraryW for each identified program module as well as application 414, and then replacing each of the original reference table references with a reference to a corresponding substitute function within the thread creation DLL 418. A program module may comprise hardware, firmware, or software such as a dynamic-link library, an application, or any subroutine or sub-function thereof.

Thereafter, initialization function 426 determines when any function is called or invoked by application 414 (block 506). When a function is called, it is then determined whether the function call was for an ExitProcess function (block 516) or at least one of a plurality of functions including the following Win32™ API functions: GetProcAddress, LoadLibraryA, LoadLibraryExA, LoadLibraryExW, and LoadLibraryW (block 508). If the application function call was for at least one of the GetProcAddress, LoadLibraryA, LoadLibraryExA, LoadLibraryExW, and LoadLibraryW functions it is then determined whether or not the reference tables for all program modules linked or otherwise associated with application 414 have been modified (block 510) during the original initialization of the thread creation DLL 418.

If it is determined that all program modules linked or otherwise associated with application 414 have been modified, initialization function 426 waits for an application function call (block 506), otherwise, initialization function 426 saves an original reference table reference for at least one of the GetProcAddress, LoadLibraryA, LoadLibraryExA, LoadLibraryExW, and LoadLibraryW functions (block 512) and then replaces each of the original reference table references with a reference to a corresponding substitute function within the thread creation DLL 418 (block 514) and then waits until an application function call is received (block 506).

If it is determined that a received application function call was for an ExitProcess function, it is then determined whether or not the reference tables for any program modules linked or otherwise associated with application 414 have been modified (block 518). If no such program modules have been modified, the illustrated process terminates immediately. Otherwise, the initialization function replaces each reference table reference to a substitute function within thread creation DLL 418 with a corresponding saved original reference table reference (block 520) and then terminates. If it is determined (blocks 508 and 516) that the received application function call was not for any of the described functions, the initialization function 426 then waits until an application function call is received (block 506).

Figure 6:
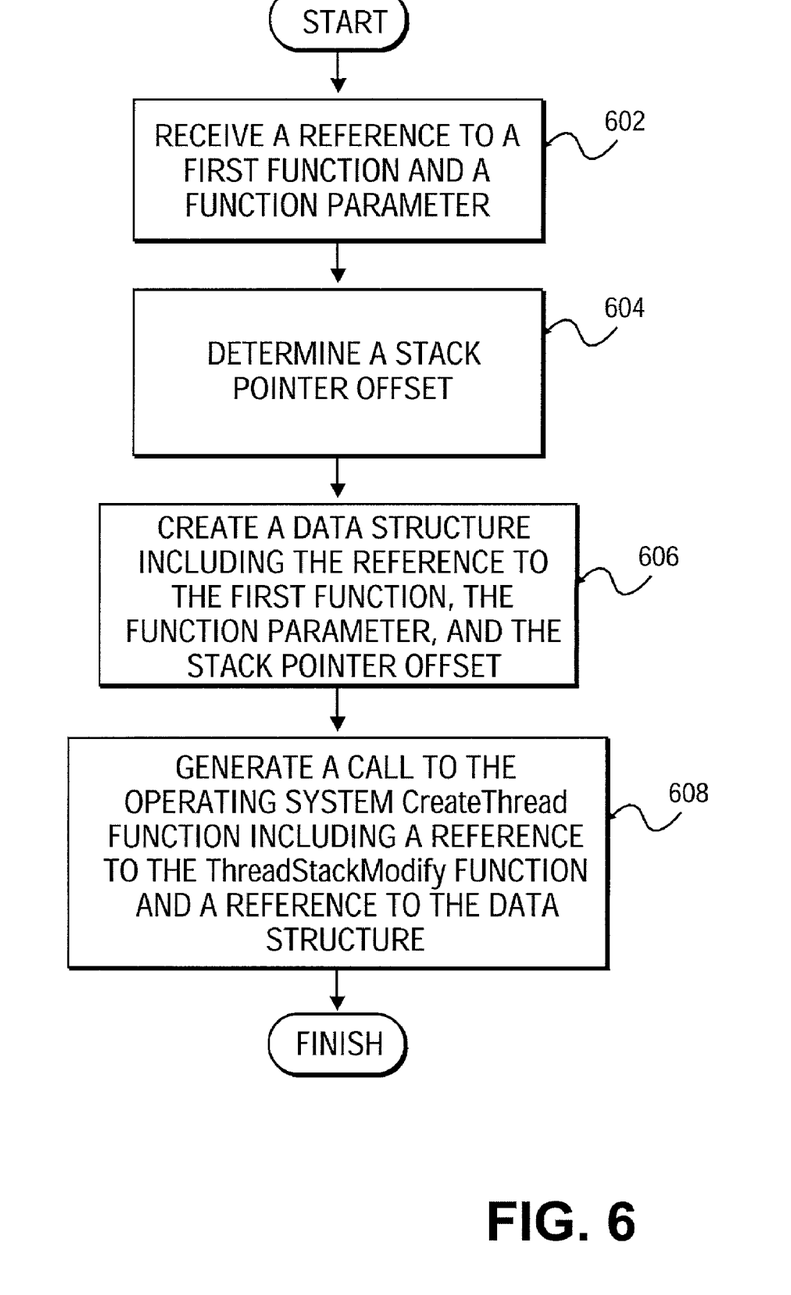
FIG. 6 illustrates a logic flow diagram of a substitute thread creation function 428 of FIG. 4 according to an embodiment of the method of the present invention.

Referring again to the embodiment illustrated in FIG. 4, the execution of initialization function 426 causes references 434 to operating system thread creation function 410 within reference tables 420 and 422 of application 414 and conventional DLL 416, respectively to be replaced with references 436 to substitute thread creation function 428. Accordingly, whenever a call to operating system thread creation function 410 is made for a function within application 414 or conventional DLL 416, the substitute thread creation function 428 of the present invention is executed. Referring now to FIG. 6, a logic flow diagram of a substitute thread creation function 428 of FIG. 4 according to an embodiment of the method of the present invention is illustrated. The illustrated function process begins when a call to operating system thread creation function 410 is made for a first function within application 414 or conventional DLL 416. A reference to the first function and a function parameter are passed as arguments by a caller and received by the substitute thread creation function 428 (block 602). Thereafter, a stack pointer offset is determined (block 604).

The value of the stack pointer offset may be determined using a variety of techniques. In one embodiment, a round-robin technique is utilized in which the stack pointer offset value is determined based on the number of threads executing within the address space 400 of the process. For example, the first thread to be created may have no stack pointer offset with the stack pointer of all subsequently created threads being increased by a fixed amount (e.g. 1 KB) which may be selected or calculated based on the total number of threads in the system. In an alternative embodiment, a random stack pointer offset may be selected. In yet other embodiments, the stack pointer offset value may be determined based on the function for which a thread is to be created, the function stack frame size, and/or the level of thrashing present or the cache line size in an associated cache.

Figure 8:
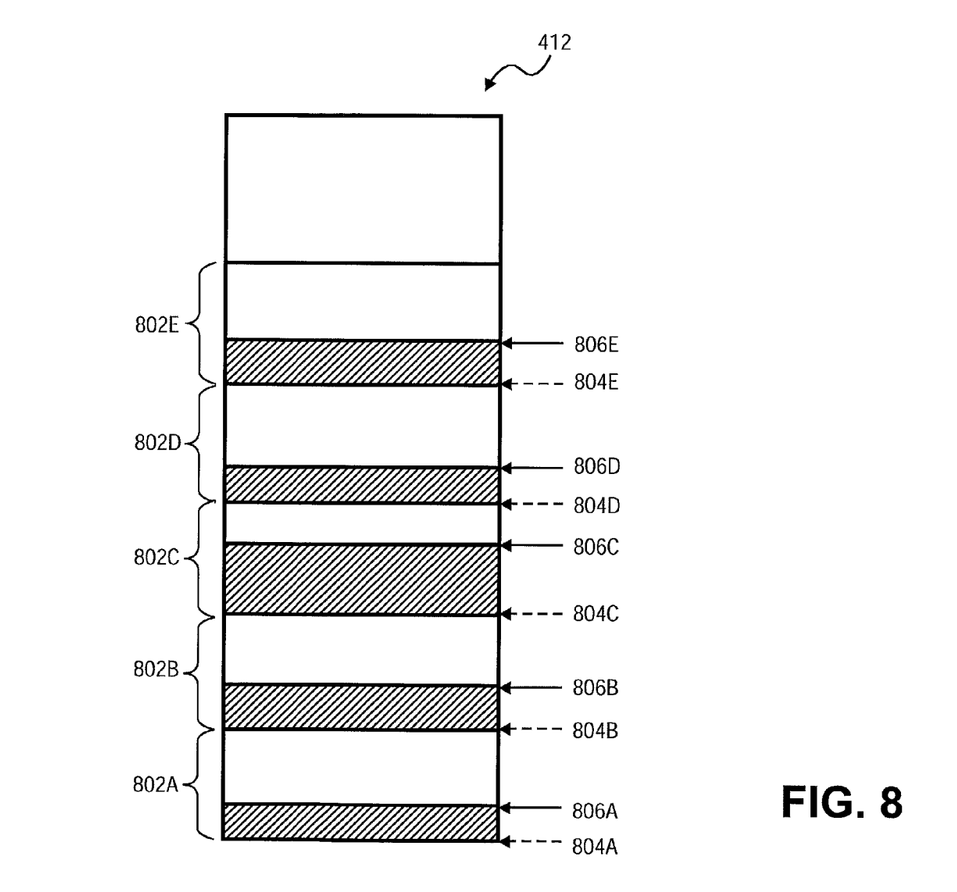
FIG. 8 illustrates a diagram of a stack area 412 of FIG. 4 according to an embodiment of the present invention.

Once the stack pointer offset has been determined, a data structure is created including the reference to the first function, the function parameter, and the stack pointer offset (block 606). A call is then generated to operating system thread creation function 410 including a reference to thread stack modification function 430 and a reference to the created data structure (block 608). Thereafter, the illustrated process terminates. Referring briefly to FIG. 8, each time a call is generated to operating system thread creation function 410 as described, a new thread is created for thread stack modification function 430. For each new thread, a new stack 802a–e is created within stack area 412 having a starting boundary and initial stack pointer 804a–e on an aligned virtual address boundary (e.g., on a 64 KB or 1 MB virtual address boundary).

Figure 7:
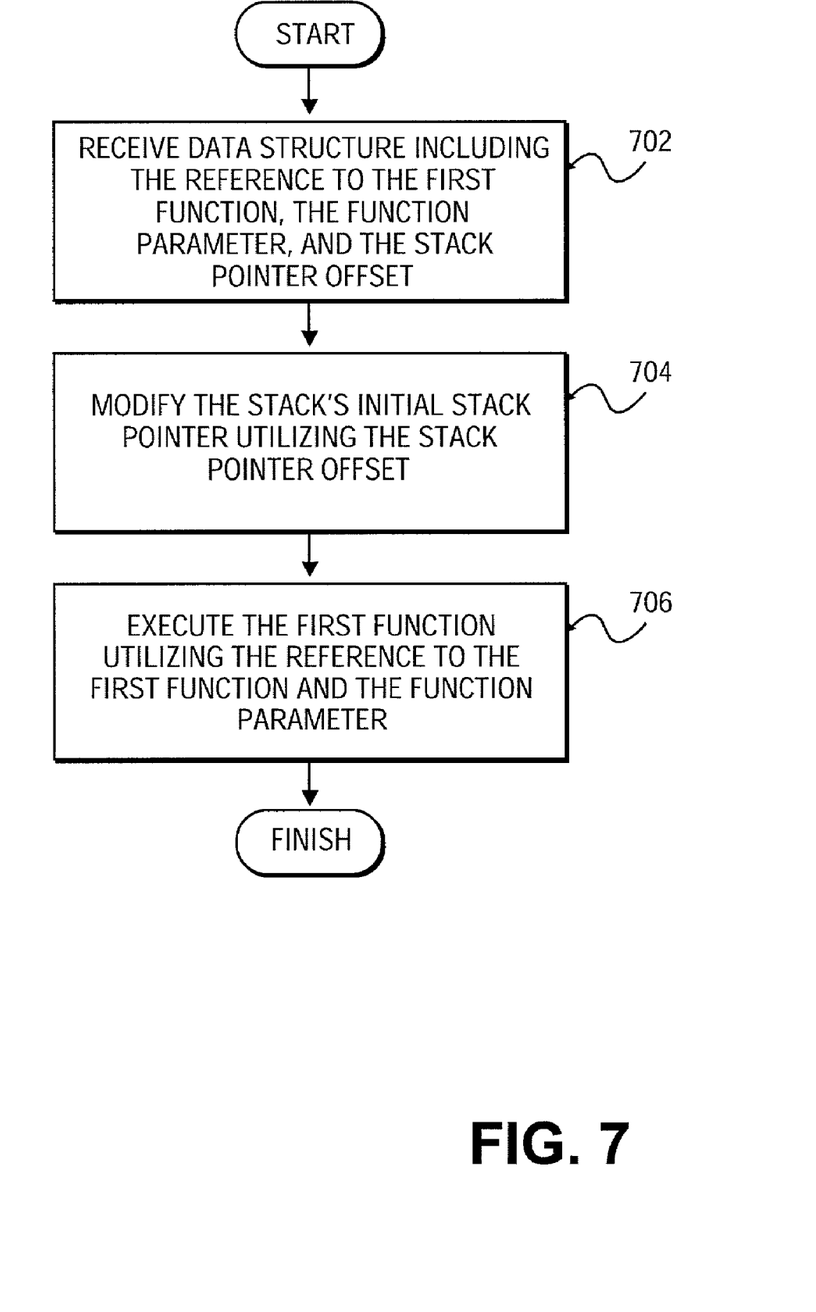
FIG. 7 illustrates a logic flow diagram of a thread stack modification function 430 of FIG. 4 according to an embodiment of the method of the present invention.

Referring now to FIG. 7, a logic flow diagram of a thread stack modification function 430 of FIG. 4 according to an embodiment of the method of the present invention is illustrated. The illustrated function process begins when a thread created for thread stack modification function 430 executes and the thread stack modification function 430 then receives the created data structure including the reference to the first function, the function parameter, and the stack pointer offset (block 702). In one embodiment, thread stack modification function 430 then copies the reference to the first function, the function parameter, and the stack pointer offset into local variables and frees or deallocates the data structure's associated memory. Next, the initial stack pointer of the created thread's stack is modified utilizing the stack pointer offset (block 704).

The initial stack pointer of the created thread's stack may also be modified utilizing a variety of techniques. In one embodiment, the initial stack pointer is modified by dynamically allocating a stack-pointer-offset-sized amount of memory on the stack using an "_alloca" function call. In an alternative embodiment, the initial stack pointer may be modified or incremented using assembly code (e.g., an "add" or "shift" assembly instruction) directly. Once the initial stack pointer of the created thread's stack has been modified, thread stack modification function 430 executes the first function utilizing the reference to the first function and the function parameter (block 706) and the illustrated process terminates.

FIG. 8 illustrates a diagram of a stack area 412 of FIG. 4 according to an embodiment of the present invention. The depicted stack area 412 includes a plurality of stacks 802a–e each having a starting boundary and initial stack pointer 804a–e occurring on an aligned virtual address boundary as shown. In the illustrated embodiment however, each initial stack pointer has been modified to include a modified stack pointer 806a–e with which an associated stack 802a–e, respectively, may be accessed.

In the foregoing description, the present invention has been described with reference to specific exemplary embodiments thereof. It will be apparent however, that variations or modifications of the exemplary embodiments described as well as alternative embodiments of the present invention may be implemented without departing from the broader spirit or scope of the present invention as defined in the appended claims. The specification and drawings are accordingly to be regarded in an illustrative rather than a restrictive sense.

What is claimed is:

1. A method comprising:
 intercepting an operating system thread creation request for a function comprising:
  intercepting an operating system thread creation request for a first function including:
   intercepting a call to an operating system thread creation function having a reference to said first function and a function parameter, and
   creating a thread for a second function including:
    determining a stack pointer offset,
    creating a data structure having said reference to said first function, said function parameter, and said stack pointer offset, and
    generating a call to said operating system thread creation function having a reference to said second function and a reference to said data structure,
  creating a thread in response to intercepting said operating system thread creation request comprises creating a thread for said second function,
 creating a thread in response to intercepting said operating system thread creation request, said thread including a stack;
 modifying an initial stack pointer of said stack; and
 executing said second function utilizing said thread in response to modifying said initial stack pointer of said stack;

wherein intercepting said operating system thread creation request for a function comprises:
  linking a dynamic-link library to a process, said process including a reference table;
  initializing said dynamic-link library; and
  wherein said reference table includes a reference corresponding to said operating system thread creation function and initializing said dynamic-link library comprises replacing said reference corresponding to said operating system thread creation function with a reference corresponding to a substitute thread creation function.

2. The method of claim 1, said method further comprising executing said second function utilizing said thread.

3. The method of claim 2, wherein modifying said initial stack pointer of said stack comprises utilizing said stack pointer offset in response to executing said second function utilizing said thread.

4. The method of claim 3, wherein modifying said initial stack pointer of said stack utilizing said stack pointer offset in response to executing said second function utilizing said thread comprises incrementing said initial stack pointer by said stack pointer offset.

5. The method of claim 2, wherein executing said first function comprises executing said first function utilizing said reference to said first function and said function parameter.

6. A tangible machine-accessible medium having machine-executable instructions embodied therein which, when executed by a machine, causes said machine to perform a method comprising:
  intercepting an operating system thread creation request for a function comprising:
    intercepting an operating system thread creation request for a first function including:
      intercepting a call to an operating system thread creation function having a reference to said first function and a function parameter, and
      creating a thread for a second function including:
        determining a stack pointer offset,
        creating a data structure having said reference to said first function, said function parameter, and said stack pointer offset, and
        generating a call to said operating system thread creation function having a reference to said second function and a reference to said data structure,
    creating a thread in response to intercepting said operating system thread creation request comprises creating a thread for said second function,
  creating a thread in response to intercepting said operating system thread creation request, said thread including a stack;
  modifying an initial stack pointer of said stack; and
  executing said second function utilizing said thread in response to modifying said initial stack pointer of said stack.
  Wherein intercepting said operating system thread creation request for said function further comprises:
    linking a dynamic-link library to a process, said process including a reference table; initializing said dynamic-link library; and
    wherein said reference table includes a reference corresponding to said operating system thread creation function and initializing said dynamic-link library comprises replacing said reference corresponding to said operating system thread creation function with a reference corresponding to a substitute thread creation function.

7. The machine-accessible medium of claim 6, said method further comprising executing said second function utilizing said thread.

8. The machine-accessible medium of claim 7, wherein modifying said initial stack pointer of said stack comprises utilizing said stack pointer offset in response to executing said second function utilizing said thread.

9. The machine-accessible medium of claim 8, wherein modifying said initial stack pointer of said stack utilizing said stack pointer offset in response to executing said second function utilizing said thread comprises incrementing said initial stack pointer by said stack pointer offset.

10. The machine-accessible medium of claim 7, wherein executing said first function comprises executing said first function utilizing said reference to said first function and said function parameter.

11. A data processing system comprising:
  a processor;
  a first memory coupled to said processor, said first memory comprising a virtually addressable cache memory; and
  a second memory coupled to said first memory, said second memory comprising:
    a first program module to intercept an operating system thread creation request for a function and to create a thread in response to an interception of said operating system thread creation request comprising:
      said first program module to intercept an operating system thread creation request for a first function and to create a thread for a second function including:
        said first program module to intercept a call to said operating system thread creation function having a reference to said first function and a function parameter; to determine a stack pointer offset; to create a data structure having said reference to said first function, said function parameter, and said stack pointer offset; and to generate a call to said operating system thread creation function having a reference to said second function and a reference to said data structure;
    a second program module to create a thread in response to intercepting said operating system thread creation request, said thread including a stack;
    said second program module to modify an initial stack pointer of said stack and to execute said second function utilizing said thread in response to a modification of said initial stack pointer of said stack including:
      said second program module to execute said first function,
    wherein said first program module and said second program module comprise: a dynamic-link library linked with a process, said process including a reference table, and
      wherein said reference table includes a reference corresponding to said operating system thread creation function and initializing said dynamic-link library comprises replacing said reference corresponding to said operating system thread creation function with a reference corresponding to a substitute thread creation function.

12. The data processing system of claim 11, wherein said initial stack pointer of said stack comprises a virtual address corresponding to a location within said virtually-addressable cache memory.

13. The data processing system of claim 11, wherein said second preprogram module comprises said second function.

14. An apparatus comprising:

A data processing system comprising:

a processor;

a first memory coupled to said processor, said first memory comprising a virtually addressable cache memory; and a second memory coupled to said first memory, said second memory comprising:

a first program module to intercept an operating system thread creation request for a function and to create a thread in response to an interception of said operating system thread creation request comprising:

said first program module to intercept an operating system thread creation request for a first function and to create a thread for a second function including:

said first program module to intercept a call to said operating system thread creation function having a reference to said first function and a function parameter; to determine a stack pointer offset; to create a data structure having said reference to said first function, said function parameter, and said stack pointer offset; and to generate a call to said operating system thread creation function having a reference to said second function and a reference to said data structure;

a second program module to create a thread in response to intercepting said operating system thread creation request, said thread including a stack;

said second program module to modify an initial stack pointer of said stack and to execute said second function utilizing said thread in response to a modification of said initial stack pointer of said stack including:

said second program module to execute said first function, wherein said first program module and said second program module comprise: a dynamic-link library linked with a process, said process including a reference table, and wherein said reference table includes a reference corresponding to said operating system thread creation function and initializing said dynamic-link library comprises replacing said reference corresponding to said operating system thread creation function with a reference corresponding to a substitute thread creation function.

* * * * *